United States Patent [19]

Li et al.

[11] Patent Number: 4,867,937

[45] Date of Patent: Sep. 19, 1989

[54] PROCESS FOR PRODUCING HIGH MODULUS FILM

[75] Inventors: Hin-Mo Li; Fred J. Roska, both of St. Paul, Minn.

[73] Assignee: Minnesota Mining and Manufacturing Company, St. Paul, Minn.

[21] Appl. No.: 14,977

[22] Filed: Feb. 17, 1987

[51] Int. Cl.$^4$ ............................................. B29C 55/02
[52] U.S. Cl. ............................... 264/290.2; 264/288.4
[58] Field of Search ............... 264/210.7, 235.6, 235.8, 264/288.4, 290.2

[56] References Cited

U.S. PATENT DOCUMENTS

| | | | |
|---|---|---|---|
| 2,823,421 | 2/1958 | Scarlett | 264/235.6 |
| 3,177,277 | 4/1965 | Adams et al. | 264/210.7 |
| 4,110,395 | 8/1978 | Akutin et al. | 264/290.2 |
| 4,226,826 | 10/1980 | Motegi et al. | 264/235.8 |
| 4,370,291 | 1/1983 | Kazama et al. | 264/210.7 |
| 4,477,407 | 10/1984 | Hetherington et al. | 264/288.4 |
| 4,497,865 | 2/1985 | Minami et al. | 264/210.7 |

FOREIGN PATENT DOCUMENTS

| | | | |
|---|---|---|---|
| 97108 | 12/1983 | European Pat. Off. | 264/210.7 |
| 37703 | 9/1972 | Japan | 264/288.4 |
| 67018 | 4/1984 | Japan | 264/210.7 |
| 228123 | 11/1985 | Japan | 264/210.7 |
| 861636 | 2/1961 | United Kingdom | 264/288.4 |
| 954204 | 4/1964 | United Kingdom | 264/210.7 |

*Primary Examiner*—James Lowe
*Attorney, Agent, or Firm*—Donald M. Sell; Walter N. Kirn; Warren R. Bovee

[57] ABSTRACT

The invention provides a two-step process for increasing the modulus of a film in a desired direction, by drawing the film at between about 10° C. above $T_g$ and 40° C. below $T_m$ at a draw ratio of between 1.05 and 5.5 and then drawing the film in the same direction at between about 5° C. and 35° C. below $T_m$ at a draw ratio of between about 1.05 and 2.5.

17 Claims, No Drawings

PROCESS FOR PRODUCING HIGH MODULUS FILM

TECHNICAL FIELD

The present invention relates to biaxially oriented films which have high Young's moduli in one or both directions and to a method of making these films.

BACKGROUND

Biaxial orientation is a process whereby a plastic film or sheet is stretched in such a way as to orient the polymeric chains of the plastic parallel to the plane of the film but more or less randomly within this plane. Biaxially oriented films possess superior tensile properties, improved flexibility and toughness, and increased shrinkability. These improved physical properties also make possible wider utilization of the electrical and optical properties of the films.

Biaxially oriented films are produced by single direction stretching or by simultaneous stretching in both directions. Tentering consists of stretching a formed flat sheet in the transverse direction with a tenter frame within an oven. A film may also be stretched in the longitudinal direction by passing the film over rollers traveling at different speeds. Bubble blowing orientation can stretch the film simultaneously in both the longitudinal and transverse directions. Another method for stretching a film simultaneously in both the longitudinal and transverse directions is described in U.K. Patent No. GB 2,038,705A.

Stretching a film in either the longitudinal direction or the transverse direction at a temperature above its glass transition temperature (hereinafter $T_g$) orients the film and results in a higher Young's modulus or tensile modulus in that direction. Typically, a film is subjected to a post orienting heating cycle for annealing (heat set) purposes if shrinkability is not desired.

There are a number of applications for films which have a higher modulus in one or both directions. The applications involve the use of a functional layer on the film, for example, an adhesive, an abrasive or a magnetic layer. Packaging tape having an increased longitudinal modulus provides a strong seal without the necessity of reinforcing elements in the tape. A film used as a backing for magnetic or abrasive particles, for example, a video tape or a sanding belt, requires a higher modulus in both the longitudinal direction, to prevent breakage, and the transverse direction, to prevent cupping or curling of the tape or belt.

The prior art has produced films having increased moduli in one or both directions through a series of drawing steps at temperatures typically between 10° C. above the $T_g$ of the film and 40° C. below melting temperature, $T_m$, of the film. See, for example, U.S. Pat. No. 4,497,865. Multiple drawing steps often result in a lower yield as each drawing step can result in breakage of the film. A process which includes multiple drawing steps is also typically higher in cost than a process involving fewer drawing steps.

It is therefore highly desirable to provide a process for increasing the modulus of a film in a two-step process, without the necessity of multiple-drawing steps.

DISCLOSURE OF THE INVENTION

The present invention provides a method of greatly increasing the modulus of a film in a desired direction comprising the steps of (i) providing a thermoplastic film having a glass transition temperature, $T_g$, and a melting temperature, $T_m$; (ii) drawing the film in at least one direction in a medium having a temperature between about 10° C. above $T_g$ and 40° C. below $T_m$ (preferably between 20° C. above $T_g$ and 100° C. below $T_m$) at a draw ratio of between 1.05 and 5.5 (preferably between 2.8 and 3.8 or between 4.0 and 5.5); and (iii) drawing the film in the same at least one direction in a medium having a temperature of between about 5° C. and 35° C. below $T_m$ at a draw ratio of between about 1.05 and 2.5 (preferably between 1.05 and 1.8).

The present invention also provides a film produced by the above method and a film having a functional layer coated thereon.

DETAILED DESCRIPTION

A film, as defined by Modern Plastics Encyclopedia, is a flat section of a material, for example, a thermoplastic resin or a regenerated cellulosic material, which is very thin in relation to its length and breadth and has a nominal thickness not greater than 0.25 mm. Similar materials with greater thickness are typically defined as sheets. As used herein the term film shall encompass both the films and sheets of the Modern Plastics Encyclopedia definition. However, the present invention is preferably used with a material having a thickness of less than 0.13 mm. Longitudinal direction is defined as the direction of a film parallel to its direction of motion during manufacture and transverse direction is the direction perpendicular thereto and in the plane of the film. If a film is made by a process which does not have a preferred direction of motion, the terms longitudinal direction and transverse direction define two perpendicular directions lying in the plane of the film.

The films of the present invention may be formed of a semicrystalline polymer material, for example, poly(ethylene terephthalate), nylon, poly(phenylene sulfide), and polyesters of aromatic dicarboxylic acids and ethylene glycol or 1,4-cyclohexane dicarbinol. Preferred are polyesters in which either terephthalic acid or 2,6 naphthalene dicarboxylic acid constitute the predominant dicarboxylic acid, with poly(ethylene terephthalate) the most preferred polyester.

The Young's modulus, or tensile modulus, of a film is a measure of the film's stiffness and is determined according to the standard method defined in ASTM D-882-11.7, extrapolated method. The tensile modulus is a ratio of the stress over strain in the initial linear portion of the stress-strain curve and reported in $Kg/mm^2$. The tensile modulus is calculated by multiplying the force, extrapolated from the curve to 1% elongation, by 100 and dividing by the original (nominal) cross-sectional area of the sample The film-forming polymers of the present invention are typically heated until molten and extruded through a nozzle or a die slit in an ordinary manner to form a film which is then cast on a cooling drum and solidified. The melting temperature is generally about 255° to 300° C. and the cooling drum is preferably cooled at 5° to 75° C. Films may also be obtained by conventional solvent casting techniques.

Once a cast film is obtained it is then drawn a first time in either the longitudinal and/or transverse direction by passing the film through a medium, preferably air, having a temperature of between about 10° C. above the $T_g$ of the film and 40° C. below the $T_m$ of the film. To draw the film in the longitudinal direction alone the film is typically passed over rollers traveling at different speeds to stretch the film. To stretch the film in the transverse direction alone the film is typically drawn with a tenter frame. To simultaneously draw the film the method described in U.K. Patent No. GB 2,038,705A may be used. The draw ratio of this first draw is typically between about 1.05 and 5.5. This first drawing induces an increase in the tensile modulus to the film in the direction or directions of draw (hereinafter "at least one direction").

In general practice, breakage of film starts to occur when the first TD draw ratio is above 5.4 times and films can not be obtained by a single TD draw which induces a TD modulus higher than 710 Kg/mm$^2$ in the film.

Prior art techniques teach several drawing steps typically in the range of between 10° C. above $T_g$ and 40° C. below $T_m$ to induce further increase in the tensile modulus to the film. These processes are multi-step drawing and sometimes involve a heat set step in between two drawing steps. Each additional step can result in breakage of the film and add to the cost of producing a high modulus film.

The present invention provides a second drawing step which alone induces substantial increase in the tensile modulus in at least one direction. This second drawing step is carried out in either the longitudinal and/or the transverse direction, but must follow a first drawing in the direction or direction of the second draw as described above. This second drawing step induces 20–40% improvement in the tensile modulus in either the longitudinal and/or transverse direction. This second drawing step can also be used to improve the tensile modulus resulting from other drawing processes.

In the second drawing step of the present invention, the film is drawn in at least one direction in a medium, preferably air, having a temperature of between 5° and 35° C. below $T_m$ with a draw ratio of between about 1.05 and 2.5. A film having tensile strength of between about 28 and 58 Kg/mm$^2$ in the at least one direction drawn is typically formed.

The invention is further described by the following non-limiting Examples.

EXAMPLES 1-15

Poly(ethylene terephthalate) films (hereinafter PET), having final thicknesses of 10 micron, 13.3 micron, 19.8 micron were prepared by melt extrusion at about 290° C., cast onto a cooling drum and then cooled rapidly to room temperature to obtain a substantially amorphous sheet. The films were stretched in the longitudinally direction at a temperature in the range of 85°–90° C. and with a draw ratio of 3.2 times by passing through a set of rollers traveling at different speeds. The films were stretched in the transverse direction at a temperature in the range of 95°–100° C. with a draw ratio ranging from 3.1 to 5.4 times by use of a tenter frame. Some of the films (Examples 1-3, 6-8, and 11-13) were heat set at 220° to 240° C. allowing relaxations ranging from 0.96 to 1.0. This is the conventional prior art method. Breakage of the film starts to occur when the first TD draw ratio is above 5.4 times and films cannot be obtained by a single TD draw which includes a TD modulus higher than 710 Kg/mm$^2$ to the film.

Films of the present invention (Examples 4, 5, 9, 10, 14, 15) were stretched a second time at a temperature of between 220° and 240° C., in the transverse direction, with a draw ratio of between 1.09 and 1.15 in a tenter frame. The $T_g$ of PET is 75° and the $T_m$ is 256° C. The results of these examples showing the substantial effect of the final transverse draws on the TD modulus, are reported in Tables 1-3. Similar effects are also obtained for the MD modulus of the film when a second longitudinal draw in the MD direction is adapted to a drawing sequence with a first MD drawing step.

TABLE 1

| EXAMPLE NO. | 1 | 2 | 3 | 4 | 5 |
|---|---|---|---|---|---|
| Thickness, micrometers | 9.8 | 10.0 | 10.1 | 9.8 | 10.3 |
| MD Draw Ratio | 3.2 | 3.2 | 3.2 | 3.2 | 3.2 |
| First TD Draw Ratio | 3.1 | 4.9 | 5.4 | 5.4 | 5.4 |
| Second TD Draw Ratio or Relaxation Ratio | 0.96 | 0.98 | 1.0 | 1.09 | 1.16 |
| MD Modulus, Kg/mm$^2$ | 451 | 472 | 413 | 384 | 377 |
| TD Modulus, Kg/mm$^2$ | 462 | 670 | 706 | 842 | 899 |

TABLE 2

| EXAMPLE NO. | 6 | 7 | 8 | 9 | 10 |
|---|---|---|---|---|---|
| Thickness, Micrometers | 13.4 | 12.5 | 12.9 | 12.4 | 13.3 |
| MD Draw Ratio | 3.2 | 3.2 | 3.2 | 3.2 | 3.2 |
| First TD Draw Ratio | 3.1 | 4.9 | 5.4 | 5.4 | 5.4 |
| Second TD Draw Ratio or Relaxation Ratio | 0.96 | 0.98 | 1.0 | 1.09 | 1.16 |
| MD Modulus, Kg/mm$^2$ | 433 | 401 | 439 | 447 | 387 |
| TD Modulus, Kg/mm$^2$ | 412 | 555 | 690 | 830 | 908 |

TABLE 3

| EXAMPLE NO. | 11 | 12 | 13 | 14 | 15 |
|---|---|---|---|---|---|
| Thickness, Micrometers | 20.3 | 19.0 | 19.8 | 19.5 | 19.6 |
| MD Draw Ratio | 3.2 | 3.2 | 3.2 | 3.2 | 3.2 |
| First TD Draw Ratio | 3.1 | 4.9 | 5.4 | 5.4 | 5.4 |
| Second TD Draw Ratio or Relaxation Ratio | 0.96 | 0.98 | 1.0 | 1.09 | 1.15 |
| MD Modulus, Kg/mm$^2$ | 492 | 384 | 389 | 396 | 388 |
| TD Modulus, Kg/mm$^2$ | 504 | 553 | 610 | 769 | 848 |

We claim:

1. A method for increasing in at least one direction the modulus of a thermoplastic film having a glass transition temperature, $T_g$, and a melting temperature, $T_m$, said method comprising
   (i) a first drawing stage wherein said film is drawn a first time in at least one direction at a temperature between about 10° C. above $T_g$ and 40° C. below $T_m$ at a draw ratio of between 1.05 and 5.5; and
   (ii) a second drawing stage to further draw said film previously drawn in stage (i) a second time in at least one direction at a temperature of between about 5° C. and 35° C. below $T_m$ and at a draw ratio of between about 1.05 and 2.5; and
wherein said film is drawn no more than two times in any given direction.

2. The method of claim 1 wherein the film is drawn said first time at a temperature of between 20° C. above $T_g$ and 100° C. below $T_m$.

3. The method of claim 1 wherein said film is drawn said second time in the transverse direction.

4. The method of claim 1 wherein said film is drawn in said first drawing stage (i) a first time in a longitudinal direction at a temperature between 20° C. above $T_g$ and 100° C. below $T_m$ at a draw ratio of between about 2.8 and 3.8 and also drawn in said first drawing stage (i) a first time in a transverse direction at a temperature of between 20° C. above $T_g$ and 100° C. below $T_m$ at a draw ratio of between about 4.0 and 5.5; and wherein said film from stage (i) is drawn in said second drawing stage (ii) a second time in said transverse direction at a temperature between about 5° C. below $T_m$ and 35° C. below $T_m$ and at a draw ratio of between about 1.05 and 2.5.

5. The method of claim 4 wherein said film is drawn said second time in said transverse direction at a draw ratio of between about 1.05 and 1.8.

6. The method of claim 1 wherein said film is drawn said second time in the longitudinal direction.

7. The method of claim 1 wherein said film is drawn in said first drawing stage (i) a first time in a longitudinal direction at a temperature between 20° C. above $T_g$ and 100° C. below $T_m$ at a draw ratio of between about 2.8 and 3.8 and also drawn in said first drawing stage (i) a first time in a transverse direction at a temperature of between 20° C. above $T_g$ and 100° C. below $T_m$ at a draw ratio of between about 4.0 and 5.5; and wherein said film from stage (i) is drawn in said second drawing stage (ii) a second time in said longitudinal direction at a temperature between about 5° C. below $T_m$ and 35° C. below $T_m$ and at a draw ratio of between about 1.05 and 2.5.

8. The method of claim 7 wherein said film is drawn said second time in said longitudinal direction at a draw ratio of between about 1.05 and 1.8.

9. The method of claim 7 wherein said film is drawn said second time biaxially at draw ratios independently chosen in each direction of between about 1.05 and 1.8.

10. The method according to claim 9 wherein said biaxial draws are performed simultaneously.

11. The method of claim 1 wherein said film comprises semicrystalline polymer.

12. The method of claim 11 wherein said semicrystalline polymer is a polyester polymer.

13. The method of claim 1 wherein said film comprises poly(ethylene terephthalate) or poly(2,6-ethylene naphthalate).

14. The method of claim 1 wherein said film is heat set at a temperature of at least 200° C. subsequent to at least one drawing step.

15. The method of claim 1 wherein said film is drawn in said first stage (i) a first time longitudinally and separately drawn a first time transversely and is cooled to room temperature between each of said first draws.

16. The method of claim 1 wherein said film is drawn in said first and second stages both the longitudinal and transverse directions simultaneously at draw ratios independently chosen in each direction of between about 1.05 and 5.5.

17. The method of claim 16 wherein said film is heat set at a temperature of at least 200° C. subsequent to at least one drawing step.

* * * * *